United States Patent
Purdy

(10) Patent No.: US 8,534,132 B1
(45) Date of Patent: Sep. 17, 2013

(54) METHOD FOR MEASURING TENSION IN AN ANCHORED ROD AT AN ACCESSIBLE END

(76) Inventor: Charles L. Purdy, Desert Hot Springs, CA (US)

( * ) Notice: Subject to any disclaimer, the term of this patent is extended or adjusted under 35 U.S.C. 154(b) by 242 days.

(21) Appl. No.: 12/927,630

(22) Filed: Nov. 19, 2010

(51) Int. Cl.
*F16B 31/02* (2006.01)

(52) U.S. Cl.
USPC .............................. 73/761; 73/856

(58) Field of Classification Search
USPC .......................... 73/760, 761, 856
See application file for complete search history.

(56) References Cited

U.S. PATENT DOCUMENTS

| | | | |
|---|---|---|---|
| 3,759,090 A | 9/1973 | McFaul | |
| 4,062,227 A | 12/1977 | Heyman | |
| 4,198,865 A | 4/1980 | Tarpley | |
| 4,308,751 A | 1/1982 | Thurner | |
| 4,429,579 A * | 2/1984 | Wilhelm | 73/768 |
| 4,466,477 A * | 8/1984 | Alofs | 164/151.2 |
| 4,700,577 A | 10/1987 | Tripp | |
| 4,862,576 A * | 9/1989 | Lu | 29/452 |
| 4,900,920 A | 2/1990 | Federmann | |
| 6,109,109 A | 8/2000 | Brown | |
| 6,311,565 B1 | 11/2001 | Hinz | |
| 6,622,561 B2 | 9/2003 | Lam | |
| 6,962,082 B2 | 11/2005 | Hashimoto | |
| 7,313,975 B1 * | 1/2008 | Scorteanu | 73/862.454 |
| 7,614,303 B2 | 11/2009 | McInerney | |

\* cited by examiner

*Primary Examiner* — Max Noori
(74) *Attorney, Agent, or Firm* — Dennis W. Beech

(57) ABSTRACT

The present invention may be used for measuring the tension in an elongated rod like body that may be fastened at an anchor end to an anchor element and that may be disposed at an accessible end relative to a securing element. A representative bolt may be secured at a first end to an accessible end of the rod like body. A housing may be positioned over the representative bolt to abut the securing element at an open first end and to allow the representative bolt to extend outwardly through a hole in a walled second end. A nut may be threaded on the representative bolt and tightened against the walled second end. A transducer may be attached to a second end of the representative bolt. The transducer may be activated to measure the length of the representative bolt. A data base of bolt length and bolt stress measurements may be used to correlate the stress level of the elongated rod like body.

10 Claims, 2 Drawing Sheets

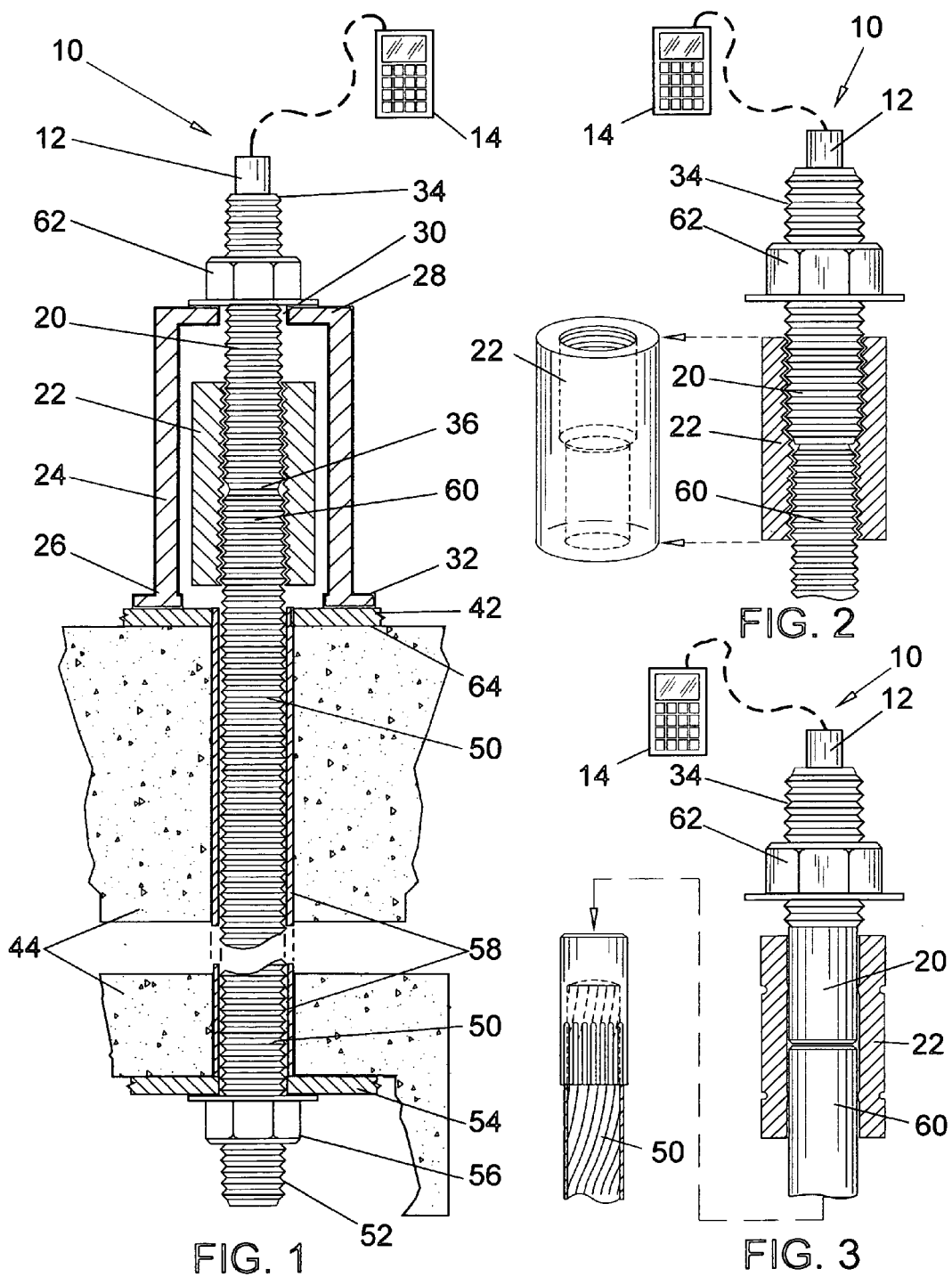

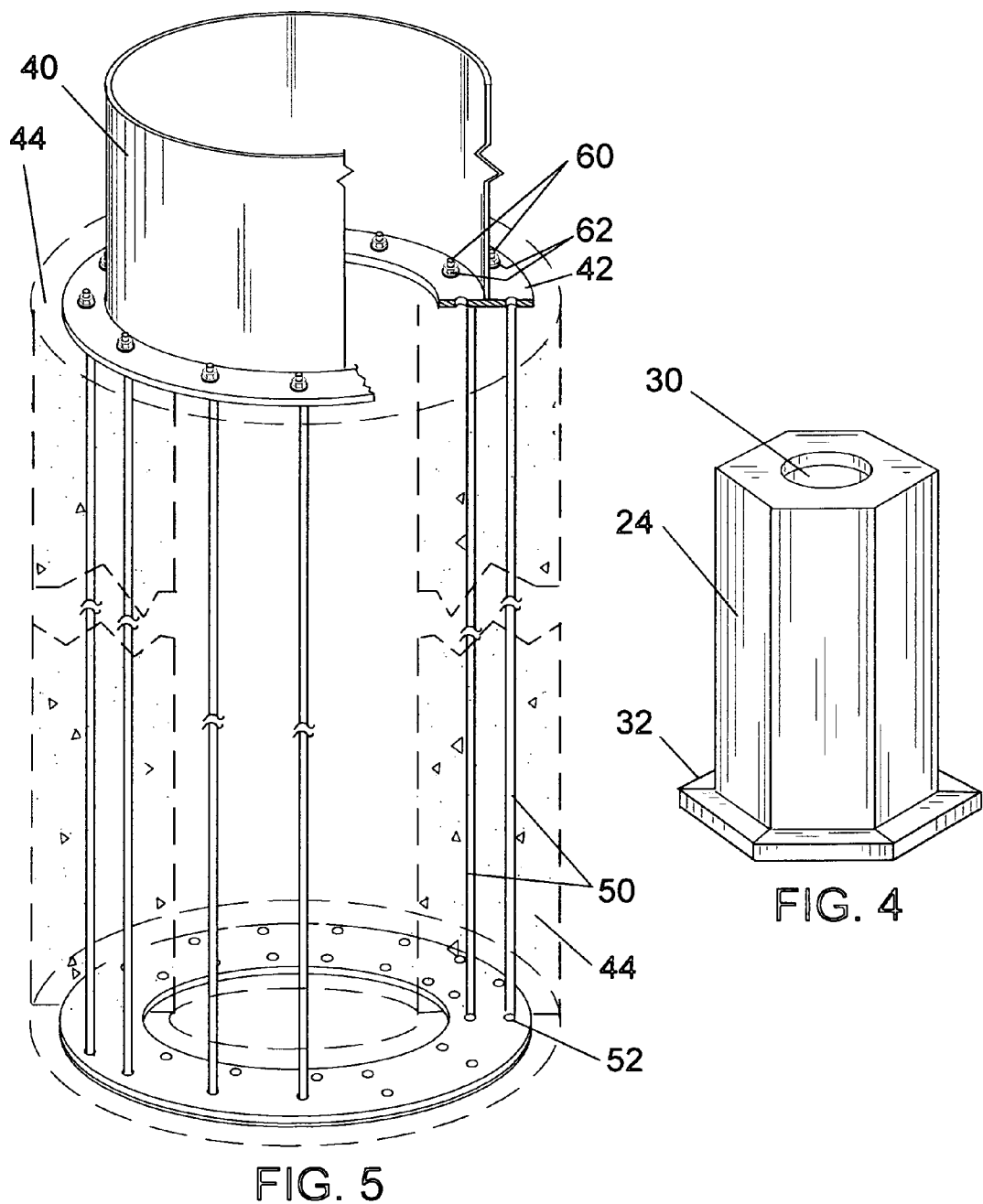

METHOD FOR MEASURING TENSION IN AN ANCHORED ROD AT AN ACCESSIBLE END

BACKGROUND OF THE INVENTION

The invention relates to methods and systems for measuring the tension in a rod, bolt, tendon or like body that is anchored or attached adjacent to one end that is not accessible and that is accessible for measurement at an opposite end. The rod or bolt may be longer than 5 to 10 feet such that direct use of an ultrasonic transducer to measure bolt length as a method to estimate bolt tension in a metal body is not effective. The new method may attach a relatively short representative bolt to the accessible end of a relatively longer anchored bolt that is generally inaccessible that may be embedded in cement, concrete, rock or other material.

Methods and apparatus may currently be known that use ultrasonic waves or vibrations to investigate rod-like bodies that may be embedded and anchored in surrounding material such as concrete, rock or other material such that the rod cannot be directly accessed at both ends and along its length. Instruments that measure elongation of a bolt while it is being tensioned/torqued that use ultrasonic's may be known. These instruments are tension bolting control systems that depend upon measuring changes in length between the unloaded and the loaded or stressed conditions of a particular fastening device, such as a bolt, while being torqued/stretched to evaluate tension. All of these type methods and apparatus may generally be useable only for short lengths of metal bolts, rods, or tendons i.e., 4 to 5 feet or less in length.

To investigate longer rod or bolt conditions, for example, bolts of 30 feet or longer, other techniques may be used than ultrasonic bolt length measurement. An example of one method that may be used for long bolts that are used for attaching a structure, for example a wind electric generator tower, to an earth embedded concrete foundation may be to use a torque wrench device to test the torque force present at an upper nut tightened on the flange of the tower base. While this may be a current practice for estimating tension on an attachment bolt, the torque devices are not accurate devices and may allow for a wide variance in estimates by a technician in recording bolt tension conditions.

SUMMARY OF THE INVENTION

The present invention is directed to methods and systems for measuring the tension in an elongated rod like body that may be fastened at an anchor end to an anchor element and that may be disposed at an accessible end relative to a securing element. A representative bolt may be secured at a first end to an accessible end of the rod like body. A tubular housing may be positioned over the representative bolt to abut the securing element at an open first end and to allow the representative bolt to extend outwardly through a hole in a walled second end. A nut may be threaded on the representative bolt and tightened against the walled second end. A transducer may be attached to a second end of the representative bolt. The transducer may be activated to measure the length of the representative bolt. A data base of bolt length and bolt stress measurements may be used to correlate the stress level of the elongated rod like body.

These and other features, aspects and advantages of the present invention will become better understood with reference to the following drawings, description and claims.

BRIEF DESCRIPTION OF THE DRAWINGS

FIG. 1 illustrates a cross-sectional elevation view of a measurement method according to an embodiment of the invention;

FIG. 2 illustrates a coupler and bolt connection according to an embodiment of the invention;

FIG. 3 illustrates a coupler and tendon connection according to an embodiment of the invention;

FIG. 4 illustrates a perspective view of a housing according to an embodiment of the invention;

FIG. 5 illustrates a perspective view of a tower installation with rods having an accessible end and an anchor end according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Referring to FIGS. 1 through 5, a rod or bolt 50 that may be anchored adjacent one end 52 that may be a lower end depending on the application or installation, may be attached to an anchor plate 54, ring or other element that may be embedded in concrete/cement in a structure such as a building, an earth embedded concrete foundation, rock formations and the like. The anchor end 52 may be attached to an anchor plate 54 or may be secured against an anchor plate 54 by a nut 56 threaded on a threaded anchor end 52. The opposite end of the bolt 50 may be an upper end depending on the application that may be secured to a brace, bracket, flange, beam or the like element of a structure such as a building, tower, bridge and the like. The end being secured for the structure may be an accessible end 60 for access to fasten a nut 62 or other device to secure the bolt 50 and tension the bolt 50 for the requirements of the installation. While use of terms such as rod and bolt are used, tendons, cables and the like may also be used with accessible and anchor end fastening devices crimped or otherwise attached at each end.

For purposes of disclosure a method and system applied to the attachment of a large metal tower, for example, a wind turbine tower having a flange at the base for attachment to an earth embedded concrete foundation, is described; however, this is not to be taken in a limiting sense. For such large tower 40 installations a tower base flange 42 may be bolted to a concrete foundation 44. The bolts 50 may be 30 feet long or longer and they may extend from an anchor plate 54 embedded in the concrete 44 upward to a foundation 64 on which the tower base flange 42 is positioned. When the cement is poured for the concrete foundation 44, the bolts 50, of which there may be fifty or more bolts depending on the tower structure, are secured to an anchor plate 54 and tower base flange 42. The bolts 50 may have tubular sleeve elements 58 positioned over the elongated body of the bolts 50 between the anchor plate 54 and the tower base flange 42 to facilitate tensioning the bolts 50.

When a tower 40 may be installed on an earth embedded concrete foundation 44, the nuts 62 may be torqued or tensioned to apply a force against the tower base flange 42 to a selected force measurement to cause a certain tension or stretching within each of the bolts 50. The force may be applied using a torque wrench, a tension apparatus or equivalent device that may be used to tension the bolts 50, to rotate the nuts 62 and that has an indicator of torque or tension force being applied. During the life of the tower 40 installation the tension of the bolts 50 needs to be inspected to assure the structural integrity of the tower and foundation. While the description uses bolts and nuts to illustrate the principles of the invention, other devices such as rods, tendons, cables and the like that may have crimped fasteners on attachment ends may be used to secure structures. Also, long bolts and the like may be secured at the anchor end 52 without the use of an anchor plate 54 or nut 56, for example, the bolts 50 may be inserted in bores in concrete, rock or other material structure and anchored with cement material or other bonding material.

A method and system to measure change in length of relatively long bolts that are accessible only at one end as for example in wind turbine tower installations may be accomplished using a representative bolt 20 attached to a bolt accessible end 60 and using an ultrasonic transducer instrument 10. For a wind turbine tower 40 a sample of bolts 50 such as 10 percent may have representative bolts 20 attached at the accessible end 60 for use in measuring bolt 50 tension, for example, in a tower installation with 70 bolts this would be every seventh bolt.

The representative bolts 20 may be 6 inches to 5 feet long and have a diameter equivalent to or greater than the tower anchor bolts 50, which may be 1½, 2½ or similar diameter in inches. A coupler 22 that may be of hollow cylindrical form with internal threads for threadable attachment to bolts 50 and representative bolts 20 can be used to secure the bolts 20, 50 end to end. The coupler 22 may also be tubular rectangular from or other structure, for example, to crimp or otherwise attached bolts, rods and the like. To modify an existing tower installation the nuts 62 attached to the bolts 50 that are to be instrumented would be removed from the accessible end 60. A coupler 22 and representative bolt 20 would then be attached to each accessible end 60. A tubular housing 24 that may be cylindrical, rectangular or other shape would then be positioned over the bolts 20, 50 and the coupler 22.

The tubular housing 24 may have an open bottom end 26 and a top end wall 28 with a hole 30 centered in the end wall 28 to allow the representative bolt 20 to protrude through wall 28. The bottom end 26 may have a bottom flange 32 for load spreading, stability and the like. With the housing 24 positioned over the bolts 20, 50 and coupler 22 with the bottom end 26 resting on a tower base flange 42, a nut 62 may be threaded on the representative bolt 20 and the nut tightened to tension the bolts 50 and representative bolts 20.

An ultrasonic transducer 12 may be attached to the upper end 34 of the representative bolt 20. The transducer 12 may then be attached to a control and display device 14 to activate the transducer to measure the length of the representative bolt 20 using longitudinal waves or vibrations to reflect from the lower end 36 of the representative bolt 20. With selection of material and characteristics for a representative bolt 20, for example, the representative bolt may be as strong or stronger than bolts 50 at an installation, the characteristics of the representative bolts 20 may be measured prior to installation and the data may be recorded for use of the changes in length of the representative bolts 20 to extrapolate measured length to determine tension of the longer bolts 50.

The method has been described as including modifying an existing anchor bolt 50 installation to add representative bolts 20. It can also be understood that in a new or initial structural installation that a representative selection of bolts 50 can be installed with representative bolts 20 already attached.

While the invention has been particularly shown and described with respect to the illustrated embodiments thereof, it will be understood by those skilled in the art that the foregoing and other changes in form and details may be made therein without departing from the spirit and scope of the invention.

I claim:

1. A method to measure the tension in an elongated rod like body that is fastened at an anchor end that is inaccessible to an anchor element and that is disposed at an accessible end to a securing element comprising:

securing a representative bolt at a first end to an accessible end of said rod like body;

positioning a housing over said representative bolt to abut said securing element at an open first end and at a walled second end having an aperture centered in said walled second end for said representative bolt to extend outwardly through said aperture;

threading a nut on said representative bolt to tighten said bolt against said walled second end;

attaching a transducer to a second end of said representative bolt and activating said transducer to measure the length of said representative bolt; and accessing a data base of bolt length and bolt stress measurements to correlate the stress level of the said elongated rod like body.

2. The method as in claim 1 wherein said elongated rod like body is a bolt with threaded ends.

3. The method as in claim 2 wherein said securing is use of a coupler that has a threaded longitudinal bore for threadable engagement with said bolt and said representative bolt.

4. The method as in claim 1 wherein said elongated rod like body is a tendon with fasteners attached at each end.

5. The method as in claim 4 wherein said securing is use of a tubular coupler that is crimped on said bolt and said representative bolt.

6. The method as in claim 1 wherein said representative bolt is approximately 6 inches to 5 feet long.

7. The method as in claim 1 wherein said transducer is an ultrasonic transducer instrument.

8. The method as in claim 1 wherein said open first end of said housing has a bottom flange.

9. A method to measure the tension in an elongated rod like body that is fastened at an anchor end to an anchor element and that is disposed at an accessible end to a securing element comprising:

said anchor end is fastened to an anchor plate that is embedded in a concrete foundation;

said accessible end is disposed relative to a structure base flange that is disposed on a foundation;

securing a representative bolt at a first end to an accessible end of said rod like body;

positioning a housing over said representative bolt to abut said securing element at an open first end and at a walled second end having an aperture centered in said walled second end for said representative bolt to extend outwardly through said aperture;

threading a nut on said representative bolt to tighten said bolt against said walled second end;

attaching a transducer to a second end of said representative bolt and activating said transducer to measure the length of said representative bolt;

accessing a data base of bolt length and bolt stress measurements to correlate the stress level of the said elongated rod like body; and said rod like body has a tubular sleeve element disposed thereon between said anchor plate and said top plate.

10. A method to measure the tension in an elongated rod like body that is fastened at an anchor end to an anchor element and that is disposed at an accessible end to a securing element comprising:

said anchor end is secured in a material structure with a bonding material;

said accessible end is disposed relative to a structure flange;

securing a representative bolt at a first end to an accessible end of said rod like body;

positioning a housing over said representative bolt to abut said securing element at an open first end and at a walled second end having an aperture centered in said walled second end for said representative bolt to extend outwardly through said aperture;

threading a nut on said representative bolt to tighten said bolt against said walled second end;

attaching a transducer to a second end of said representative bolt and activating said transducer to measure the length of said representative bolt;

accessing a data base of bolt length and bolt stress measurements to correlate the stress level of the said elongated rod like body; and said rod like body has a tubular sleeve element disposed thereon adjacent said accessible end.

* * * * *